Figure 1:
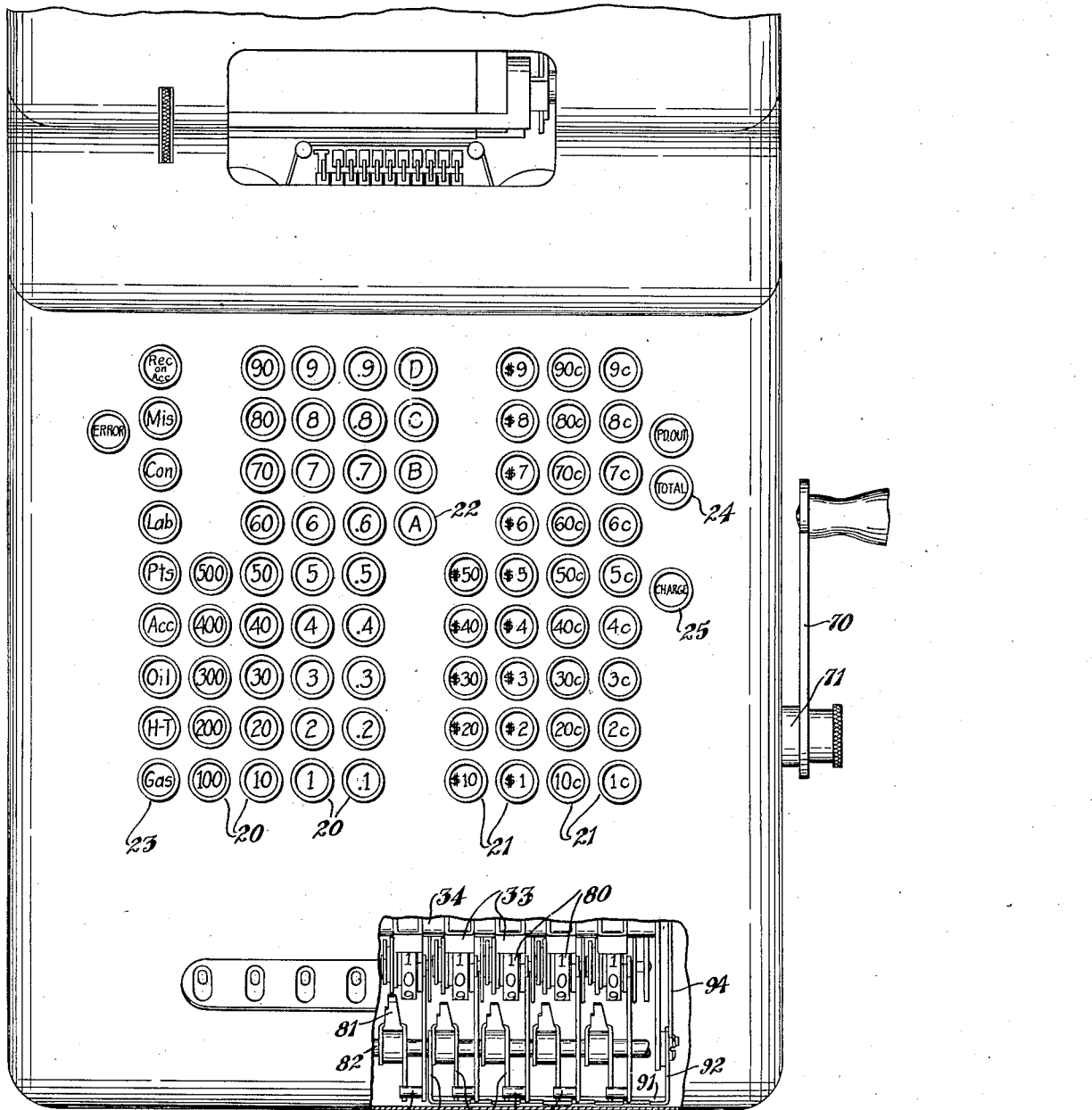

Fig. 1.  Harold W. Clark

March 17, 1942.  H. W. CLARK  2,276,464
CALCULATING MACHINE
Filed Aug. 3, 1939  4 Sheets-Sheet 2

Inventor
Harold W. Clark
By Frease and Bishop
Attorneys

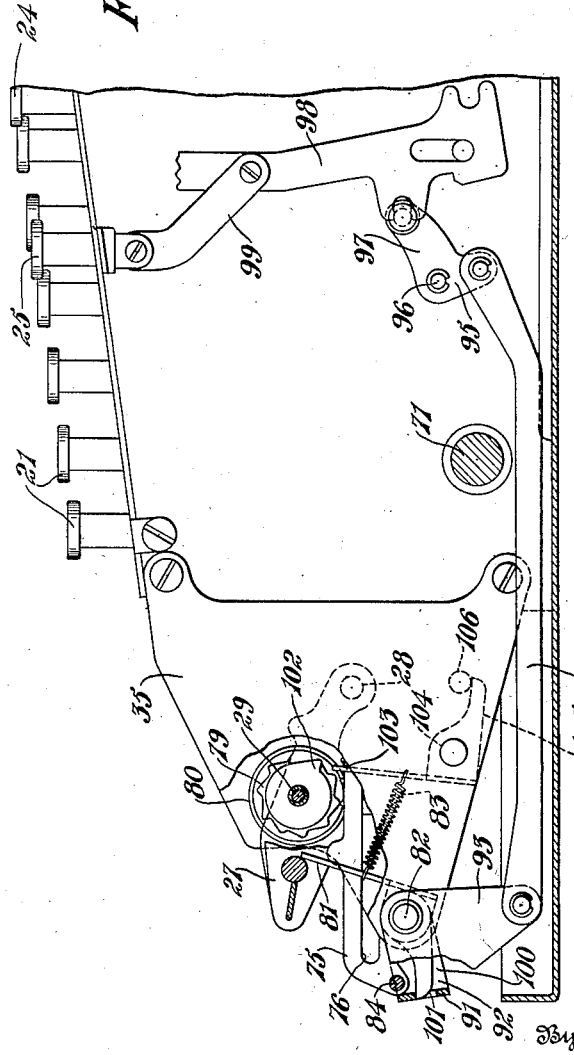

March 17, 1942.  H. W. CLARK  2,276,464
CALCULATING MACHINE
Filed Aug. 3, 1939  4 Sheets-Sheet 4

Inventor
Harold W. Clark
By Frease and Bishop
Attorneys

Patented Mar. 17, 1942

2,276,464

UNITED STATES PATENT OFFICE 2,276,464

CALCULATING MACHINE

Harold W. Clark, Alliance, Ohio, assignor to The McCaskey Register Company, Alliance, Ohio, a corporation of Ohio Application August 3, 1939, Serial No. 288,164

4 Claims. (Cl. 235—60)

The invention relates to calculating machines, and has special reference to the construction of the accumulator of such a machine particularly adapted for use in cash registers, the calculating mechanism thereof being of the general type as disclosed in Johantgen Patents No. 1,306,112, dated June 10, 1919, and No. 1,336,840, dated April 13, 1920, the particular invention being directed to the accumulator mechanism of the general type shown in Johantgen Patent No. 1,810,213, dated June 16, 1931.

The invention is especially adapted for use in the type of machines having a split keyboard comprising a plurality of banks of number keys for designating the prices of goods sold, and another plurality of banks of number keys for indicating the amounts of goods sold in gallons, pounds or the like.

Such machines are used quite generally in many business places, and are quite satisfactory for performing cash transactions, but where a charge transaction is performed difficulty is experienced.

The reason for this is because whenever a cash transaction is recorded by the machine the number of gallons, pounds or the like will be added into the left hand side of the machine and the price will be added into the right hand side.

However, when a charge transaction is recorded on the machine the price is not added into the right hand side of the machine and when a total is taken only the cash items are totaled.

If the amount in gallons, pounds, or the like, is recorded in the same transaction as the charge item then this amount is not added into the left hand side of the machine and when a total is taken only the amounts in gallons, pounds, or the like included in cash items are recorded in the total.

The object of the present improvement is to improve machines of the type referred to so that the amounts in gallons, pounds, or the like, of goods sold in a charge transaction may be set up in the same item with the price charged for such goods and the amounts added into the total on the left side of the machine while the price of the charge item will not be added into the right side of the machine, whereby at the end of the day a total may be obtained of the total amount sold in gallons or the like either for cash or charge and the same time a total may be obtained for all of the cash items, whereby the merchant may know exactly how many gallons of gasoline or the like he has sold during the day and the amount of cash he has taken in during the day.

Another object is to utilize a separable two-part rack bar actuator, in each bank on the right side of the machine, cooperating pawl and ratchet means being actuated by depression of the charge key for preventing rotation of the accumulator wheels in these banks when a charge item is recorded so that the price of the same is not added into the total, means being provided for normally holding the pawl out of engagement with the ratchet so that cash price items may be added into the total on the right side of the machine.

The above objects together with others which will be apparent from the accompanying drawings or which may be later referred to may be attained by constructing the improved calculating machine in the manner illustrated in the accompanying drawings in which—

Figure 2:
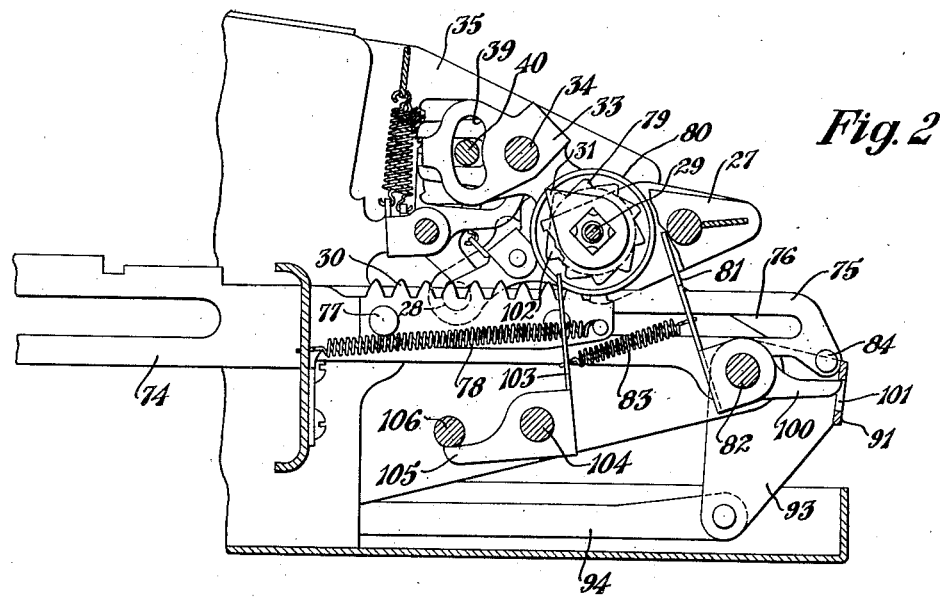
Figure 3:
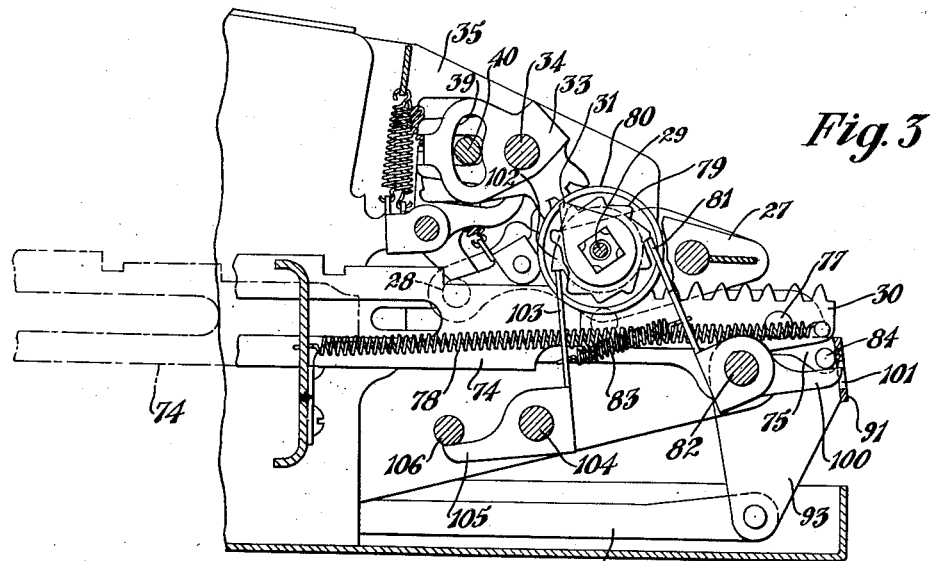
Figure 4:
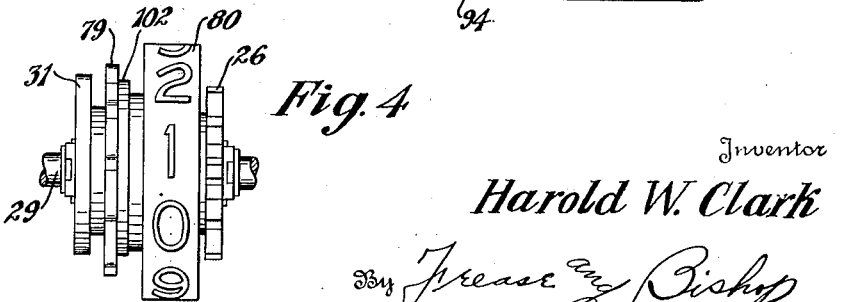
Figure 8:
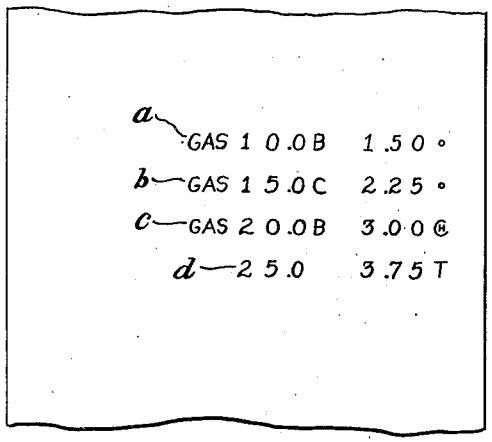
Figure 9:
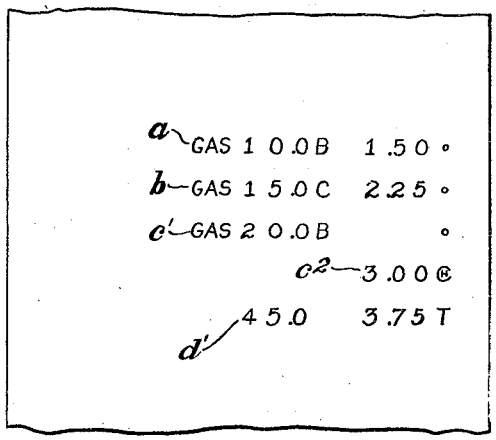
Figure 10:
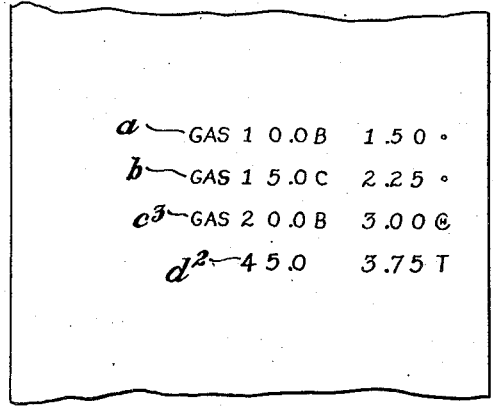
Figure 7:
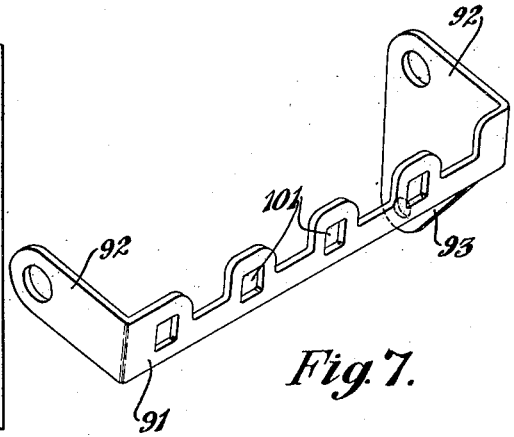

Figure 1 is a top plan view of a calculating machine embodying the invention, parts being broken away for the purpose of illustration;

Fig. 2, a fragmentary transverse sectional view through the accumulator showing the parts in the neutral or normal position;

Fig. 3, a similar view showing the parts just at the start of the return stroke when the nine key of this bank and the charge key have been depressed;

Fig. 4, an edge elevation of one of the improved accumulator wheels;

Fig. 5, a transverse section looking in the opposite direction from Fig. 2 showing the parts in the same position as in Fig. 2 and showing the connection of the accumulator rack bar to the type bar;

Fig. 6, a fragmentary sectional elevation of the forward portion of the machine showing the connection between the charge key and the yoke which normally holds the pawls out of engagement with the ratchets upon the accumulator wheels on the right side of the machine;

Fig. 7 a detached perspective view of the yoke operated by the charge key for normally holding the accumulator mechanism on the right hand side of the machine in condition to add in normal manner and for preventing the same from adding when the charge key is operated;

Fig. 8 a fragmentary elevation of a portion of the record strip for the ordinary split keyboard machine showing that the amount of material in a charge item is not added into the total;

Fig. 9 a similar view showing how the desired result can only be obtained on the ordinary split keyboard machine by two separate operations; and Fig. 10 a similar view showing the same transactions carried out on the improved machine to which the invention pertains giving the total of all material items on the left hand side and the total of only the cash items on the right side.

Similar numerals refer to similar parts throughout the several views.

The invention is illustrated as applied to a machine of the double or split keyboard type, the left side of which is adapted for indicating the amounts of goods purchased in gallons or the like, and the right side is adapted for indicating the price of each purchase.

For this purpose a plurality of banks of number keys 20 are provided on the left side of the machine for indicating in units, tens, hundreds and decimal fractions, the number of articles purchased, and on the right side of the machine a plurality of banks of number keys 21 are provided for indicating the purchase price in dollars and cents.

A bank of keys 22 may be located in the middle of the machine, if desired, for indicating the clerk or department making the sale, and on the left side of the machine a bank of keys 23 may be provided for indicating the articles purchased.

The particular keyboard illustrated in Fig. 1 is designed for use in automobile service stations, and the number of keys 20 are generally intended for use only for indicating the number of gallons of gasoline sold.

Totals from the banks 21 may be carried into the bank 22, and totals from the banks 20 may be carried into the bank 23, but there is no carryover from the bank 22 to the left side of the machine.

The usual total key 24 is provided for totaling on both sides of the machine, and the charge key 25 is provided for controlling operation of the mechanism of the right side only of the machine.

The invention pertains generally to changes in the construction of the mechanism in the right side of the machine and for this reason this mechanism will be first described.

The accumulator mechanism of this machine is the same as disclosed in detail in the above mentioned Johantgen Patent No. 1,810,213, and briefly, this mechanism includes a series of toothed wheels or pinions 26, one for each bank of number keys, and one for the bank of keys 22, the wheels 26 being journaled upon a shaft 29 carried by the swinging frame 27, pivoted at 28 so as to throw the wheels 26 into and out of mesh with the racks 30.

The accumulator also includes the cams 31 upon the shaft 29 for tripping the carry lock release members 32, and the toothed carry dogs 33 mounted on the rock shaft 34 journaled in the side frames 35, and having the openings 39 which receive the setting rod 40, carried by arms upon the rock shaft 34.

The further construction and operation of the accumulator is generally the same as illustrated and described in said Johantgen patents, and therefore, no further description of the accumulator mechanism is believed necessary.

The machine may be operated by the usual operating handle 70, or by the customary motor for oscillating the main shaft 71 of the machine. The mechanism for operating the setting and restoring rod 40 may vary in construction, and since the same does not form a part of the present invention it is not illustrated, but for the purpose of this case it may be assumed that this mechanism is the same as illustrated and described in detail in Patent No. 1,810,213, above referred to.

Each of the keys 20, 21, 22 and 23 is a rack-controlling key for controlling the limit of movement of a rack associated with each bank of said keys in the same manner as illustrated and described in said Johantgen patents above referred to, and since the racks associated with the keys 20, on the left side of the machine, may be the same as illustrated in Johantgen Patents No. 1,306,112, No. 1,336,840 and No. 1,810,213, and also since these racks per se are not the object of the present invention, it is not thought necessary to illustrate the same.

However, the racks associated with the banks of keys on the right side of the machine form a part of this invention, and these racks are illustrated and described in detail.

Each of these racks differs from the conventional racks of said patents in that the toothed portion 30 thereof, is separable from the main portion 74 of the rack, and is mounted for horizontal reciprocation upon a guide plate 75, which is fixed to any stationary portion of the machine and provided with a horizontal slot 76, within which the studs 77, carried by the separable toothed portion 30 of the rack, are slidably mounted.

A spring 78 is attached to the forward end of the separable end 30 of the rack, and to any suitable stationary portion of the machine, so as to normally urge the same backward or toward the main portion 74 of the rack.

A ratchet wheel 79 is fixed upon the opposite side of each accumulator or register wheel 80 from the pinion 26, and adapted to cooperate with a pawl 81, pivoted as at 82 to a stationary portion of the machine, and adapted to be urged into engagement with the ratchet as by a spring 83, a stud 84 limiting the movement of the pawl in this direction.

The type bars, indicated at 85, are adapted to be operated by the sliding rack bars in the same manner as illustrated and described in detail in the Johantgen patents and the connection between each rack bar and the corresponding type bar comprises a link 86 and a bell crank lever 87, as shown in Fig. 5, the several bell crank levers swinging in vertical planes upon a horizontal tie rod 88 which extends transversely through the machine.

One arm 89 of each bell crank lever has a pivotal connection with the corresponding type bar at 90, the link 86 being connected to the other arm of said bell crank.

A yoke 91, as shown in detail in Fig. 7, is provided for the purpose of normally holding the pawls 81 out of engagement with the ratchets 79, as shown in Fig. 2, so that the racks 30—74 will function in the same manner as the one piece racks of the Johantgen patents referred to.

This yoke has arms 92 at its ends, pivoted upon the shaft 82, and is adapted to be oscillated from the normal position shown in Fig. 2, to the operated position shown in Fig. 3, by depression of the charge key 25.

The connection between the yoke 91 and the charge key 25 may comprise the lever 93, which is part of one arm 92, and connected at its lower end to one end of the link 94, and the other end of which is connected to the arm 95 of a bell crank fulcrumed at 96, the arm 97 thereof being connected to the vertically slidable bar 98 which is directly connected to the extension 99 upon the charge key 25, whereby downward movement of said charge key will rotate the shaft 82 clockwise, as viewed in Fig. 6, to swing the yoke 91 upward from the position shown in said figure.

Each pawl 81 has a forwardly projecting finger 100 adapted to be received in one of the openings 101 of the yoke 91, whereby the pawls are held out of engagement with the ratchets 79 when the yoke is in the normal position shown in Figs. 2 and 6, but permitting the fingers 100 to rise into contact with the studs 84, which permits the pawls to engage the ratchets, when the yoke is raised, as shown in Fig. 3.

The total stop ratchet disk 102 is fixed to each pinion 26 between the wheel 80 and the ratchet 79, and cooperates with the total stop pawl 103, which is pivoted as at 104 and normally urged toward the ratchet disk 102 by means of the spring 83, the finger 105 of said pawl contacting the rod 106 and limiting the movement of the pawl.

In the adding operation of machines of this general type the depression of any of the rack controlling keys 20 and 21, limits the movement of the respective racks which they control, and when the main shaft 71 is oscillated after the desired keys are depressed the racks move forward on the forward stroke of the main shaft and the accumulator is rocked downward into mesh with the racks at the end of the forward stroke and remains in mesh until the end of the return stroke.

In the totaling operation of the accumulator meshes with the racks at the beginning of the forward stroke and is moved upward out of mesh at the end of the forward stroke and before the beginning of the return stroke.

It will be seen that with the yoke 91 in the normal position, holding the pawls 81 out of engagement with the ratchets 79, the separable racks 30—74 will function in the same manner as the usual one piece racks of said Johantgen patents.

Thus, when an item is set up on the right side of the machine, by means of the keys 21, and the main shaft 71 is oscillated, this item will be added in the manner described in detail in the Johantgen patents.

Since the left side of the machine, controlled by the keys 20, is provided with the conventional one piece racks, instead of the separable racks such as 30—74, and is otherwise constructed as illustrated and described herein, it is evident that each item set up by the keys 20 will be added in when the main shaft is operated.

Referring again to the right side of the machine, it will be seen, however, that when the charge key 25 is depressed at the time an item is set up by the keys 21, the yoke 91 will be raised so as to permit the pawls 81 to engage the ratchets 79 as will now be described.

When the main shaft is operated the racks will move forward during the forward stroke of the machine in the manner above mentioned, and as described in detail in Johantgen Patent No. 1,810,213, and at the end of the forward stroke the accumulator wheels will be lowered into mesh with the racks as shown in Fig. 3.

At this point the pawls 81 will engage the ratchet wheels 79, in the manner shown in Fig. 3, so that on the return stroke of the machine the accumulator wheels will be held against rotation. The sections 74 of the racks after operating the printing section return to normal position, and the separable sections 30 of the racks will remain in the forward position until the end of the return stroke, when the accumulator wheels will be raised out of mesh with the sections 30 of the racks, moving the ratchet wheels 79 upward out of engagement with the pawls 81, at which time the springs 78 will return the separable, toothed portions 30 of the racks to normal position, these parts then assuming the positions shown in Fig. 2 of the drawings.

It should be remembered however that unless the charge key 25 is depressed the yoke 91 will remain in lowered position, as in Figs. 2, 5 and 6, holding the pawls 81 out of engagement with the ratchet wheels 79, permitting the spring loaded, separable, toothed portions 30, of the racks, to move backward with the main portions 74 of the racks, on the backward stroke of the machine, whereby the racks on the right hand side of the machine will function the same as the one-piece racks on the left hand side of the machine, so that the mechanism on the right side of the machine will add and carry in exactly the same manner as described in detail in said Johantgen patent.

Thus it will be seen that all items entered in the left side of the machine, that is gallons, or other quantities of material sold, will be added into the total on that side of the machine, and under normal operation of the right side of the machine for cash transactions, all items entered on that side, that is prices of material sold, will be normally added into the total on that side of the machine.

However, it will be obvious that when the charge key 25 is depressed and an item of price is entered on the right side of the machine, this side of the machine will operate as above described preventing this charge item from being added into the total on this side of the machine, while not interfering with the printing of this charge item and not interfering with the normal adding operation of any item entered on the left side of the machine.

Thus, the quantities of all items, either cash or charge, will be added into the total on the left side of the machine, and the prices of all cash items will be added into the total on the right side of the machine, while the prices of all charge items will be kept out of the total on the right side of the machine, so that at the end of the day when a total is taken, the machine will record a total of all quantities sold, on the left side, and of all cash taken in, on the right side.

To illustrate the improvement over the prior art machines, Fig. 8 shows a portion of the record strip of the machine, showing two cash items $a$ and $b$, and a charge item $c$, each item showing the quantity in gallons on the left side and the price at the right side. It will be seen that the total $d$ shows only the total quantity and total price of the cash items.

In order to operate the old type machine to obtain the total quantity of all items, but only the total price of cash items, it would be necessary to set up all charge items in two separate items, one for quantity and the other for price, as shown in Fig. 9, in which the cash items $a$ and $b$ are the same as in Fig. 8, and are entered in the machine in the normal manner. However, the quantity portion $c'$ of the charge item must be first entered so that it will add into the total $d'$ on the left side while the price portion $c^2$ of this charge item must be entered separately so that it will not be added into the total on the right side of the machine.

This does not provide for a convenient or satisfactory manner of entering such charge items and is not practical in commercial use of the machine.

As shown in Fig. 10, with the improved machine to which the invention pertains, charge item, as at $c^3$, may be entered in a single operation in the same manner as cash items $a$ and $b$, and when the total $d^2$ is taken it represents the total quantity of all items, both charge and cash, and the total price of only cash items, as shown.

Although in the form of the invention illustrated and described above, a split machine is shown having mechanism for adding and recording quantities on one side and mechanism for adding and recording prices on the other side with means operated by depression of the charge key for preventing adding of certain price items, it should be understood that the invention is applicable to a split machine in which other items than quantities and prices may be recorded and added and the mechanism for adding on one side of the machine may be rendered inoperative by operation of some other key than the charge key.

I claim:

1. In a calculating machine, the combination of a plurality of accumulator wheels, a corresponding plurality of type bars, a differential actuating slide connected to each type bar, a rack yieldably connected to each actuating slide for independent movement in one direction, and for actuating the corresponding accumulator wheel, means for moving the accumulator wheels into and out of engagement with the racks, means for reciprocating said actuating slides, pawls normally held out of engagement with said accumulator wheels, a key, and means actuated by the operation of said key for moving the pawls into engagement with the accumulator wheels to block actuation thereof by said racks, the actuating slides being non-yieldingly connected to the type bars so that the blocking of the accumulator wheels by the pawls while said wheels are engaged with said racks prevents actuation of said wheels without interference with the setting of the type bars.

2. In a calculating machine, the combination of a plurality of accumulator wheels, a corresponding plurality of type bars, a differential actuating slide connected to each type bar, a rack yieldably connected to each actuating slide for independent movement in one direction, and for actuating the corresponding accumulator wheel, means for moving the accumulator wheels into and out of engagement with the racks, means for reciprocating said actuating slides, pawls for cooperation with said accumulator wheels, a yoke normally holding the pawls out of engagement with said wheels, and a key for actuating said yoke to move the pawls into engagement with the wheels to block actuation thereof by said racks, the actuating slides being non-yieldingly connected to the type bars so that the blocking of the accumulator wheels by the pawls while said wheels are engaged with said racks prevents actuation of said wheels without interference with the setting of the type bars.

3. In a calculating machine, the combination of a plurality of accumulator wheels, a corresponding plurality of type bars, a differential actuating slide connected to each type bar, a rack yieldably connected to each actuating slide for independent movement in one direction, and for actuating the corresponding accumulator wheel, means for moving the accumulator wheels into and out of engagement with the racks, means for reciprocating said actuating slides, pawls for cooperation with said accumulator wheels, spring means normally urging the pawls toward said accumulator wheels, a yoke normally rendering the spring means inoperative, and a key for actuating said yoke to release the spring means so that the pawls are moved into engagement with the wheels to block actuation thereof by said racks, the actuating slides being non-yieldingly connected to the type bars so that the blocking of the accumulator wheels by the pawls while said wheels are engaged with said racks prevents actuation of said wheels without interference with the setting of the type bars.

4. In a calculating machine, the combination of a plurality of accumulator wheels, a corresponding plurality of type bars, a differential actuating slide connected to each type bar, a rack yieldably connected to each actuating slide for independent movement in one direction, and for actuating the corresponding accumulator wheel, means for moving the accumulator wheels into and out of engagement with the racks, means for reciprocating said actuating slides, pawls pivoted adjacent to said accumulator wheels, fingers upon said pawls, a yoke normally engaging said fingers to hold the pawls out of engagement with the wheels, a key, and means operatively connecting the key and the yoke so that by depression of the key the yoke will be moved to swing the pawls into engagement with the wheels to block actuation thereof by said racks, the actuating slides being non-yieldingly connected to the type bars so that the blocking of the accumulator wheels by the pawls while said wheels are engaged with said racks prevents actuation of said wheels without interference with the setting of the type bars.

HAROLD W. CLARK.